US011733995B2

(12) United States Patent
Kauppinen et al.

(10) Patent No.: US 11,733,995 B2
(45) Date of Patent: Aug. 22, 2023

(54) PEOPLE CONVEYOR SYSTEM AND A METHOD FOR UPDATING SOFTWARE OF A PEOPLE CONVEYOR COMPONENT IN A PEOPLE CONVEYOR SYSTEM

(71) Applicant: Kone Corporation, Helsinki (FI)

(72) Inventors: Tuukka Kauppinen, Helsinki (FI); Risto Jokinen, Helsinki (FI); Mikko Paakkinen, Helsinki (FI)

(73) Assignee: Kone Corporation, Helsinki (FI)

( * ) Notice: Subject to any disclaimer, the term of this patent is extended or adjusted under 35 U.S.C. 154(b) by 72 days.

(21) Appl. No.: 17/241,501

(22) Filed: Apr. 27, 2021

(65) Prior Publication Data

US 2021/0373879 A1    Dec. 2, 2021

(30) Foreign Application Priority Data

May 29, 2020   (EP) .................................... 20177284
Aug. 12, 2020   (EP) .................................... 20190689

(51) Int. Cl.
*G06F 8/656* (2018.01)
*B66B 25/00* (2006.01)
(Continued)

(52) U.S. Cl.
CPC .............. *G06F 8/656* (2018.02); *B66B 25/00* (2013.01); *B66B 25/003* (2013.01); *G06F 8/433* (2013.01);
(Continued)

(58) Field of Classification Search
CPC ............ G06F 8/656; G06F 8/433; G06F 8/61; G06F 8/71; G06F 8/65; G06F 21/602;
(Continued)

(56) References Cited

U.S. PATENT DOCUMENTS 10,489,146 B2 * 11/2019 Matthew ................... G06F 8/61
2004/0083474 A1 * 4/2004 McKinlay .............. G06Q 30/06
717/176
(Continued)

FOREIGN PATENT DOCUMENTS

EP          2916219 A1      9/2015
EP          3392191 A1     10/2018
(Continued)

OTHER PUBLICATIONS

Zhang, Ji, Zhi Liao, and Ling Zhu. "Research on Design and Implementation of Automotive ECUs Software Remote Update." Applied Mechanics and Materials. vol. 740. Trans Tech Publications Ltd, 2015. (Year: 2015).*

(Continued)

*Primary Examiner* — Kevin L Young
*Assistant Examiner* — Joanne G Macasiano
(74) *Attorney, Agent, or Firm* — Harness, Dickey & Pierce, P.L.C.

(57) ABSTRACT

A method for performing a software update of a people conveyor component in a conveyor system includes downloading a software update from a remote update system based on a request from one or more of the remote update system, at least one conveyor component or the conveyor system such that the software update is downloaded as a background download without affecting an operation of the conveyor system.

19 Claims, 3 Drawing Sheets

(51) Int. Cl.
  *G06F 8/61* (2018.01)
  *G06F 8/71* (2018.01)
  *G06F 8/41* (2018.01)
  *H04L 9/08* (2006.01)

(52) U.S. Cl.
  CPC ............... *G06F 8/61* (2013.01); *G06F 8/71* (2013.01); *H04L 9/0822* (2013.01)

(58) Field of Classification Search
  CPC ..... B66B 25/00; B66B 25/003; B66B 19/007; B66B 1/3407; B66B 9/00; B66B 21/02; B66B 21/10; H04L 9/0822
  See application file for complete search history.

(56) References Cited

U.S. PATENT DOCUMENTS

| | | | |
|---|---|---|---|
| 2009/0049441 | A1 | 2/2009 | Mii et al. |
| 2013/0227540 | A1* | 8/2013 | Ruster ................ G06F 8/65 717/173 |
| 2015/0007262 | A1* | 1/2015 | Aissi ................ G06F 21/60 726/2 |
| 2017/0144858 | A1* | 5/2017 | Gandhi ............... H04L 67/34 |
| 2018/0157482 | A1* | 6/2018 | Kirchhoff ........... G06F 21/64 |
| 2020/0042307 | A1* | 2/2020 | Grondine ............ H04L 67/34 |
| 2020/0350778 | A1* | 11/2020 | Nemecek ........... G05B 19/18 |
| 2022/0091838 | A1* | 3/2022 | Lee ................... G06F 8/433 |

FOREIGN PATENT DOCUMENTS

| | | |
|---|---|---|
| EP | 3173366 B1 | 9/2019 |
| EP | 3617111 A1 | 3/2020 |

OTHER PUBLICATIONS

Odat, Hesham A., and Subra Ganesan. "Firmware over the air for automotive, fotamotive." IEEE International Conference on Electro/Information Technology. IEEE, 2014. (Year: 2014).*

Xu, Meng, et al. "Dominance as a new trusted computing primitive for the internet of things." 2019 IEEE Symposium on Security and Privacy (SP). IEEE, 2019. (Year: 2019).*

Muehlbach, Andreas, et al. "Concurrent driver upgrade: Method to eliminate scheduled system outages for new function releases." IBM journal of research and development 51.1.2 (2007): 185-193. (Year: 2007).*

Mugarza, Imanol, et al. "Dynamic software updates to enhance security and privacy in high availability energy management applications in smart cities." IEEE Access 7 (2019): 42269-42279. (Year: 2019).*

Extended European Search for European Patent Application No. 20177284 dated Oct. 23, 2020.

Extended European Search for European Patent Application No. 20190689.8 dated Jan. 22, 2021.

* cited by examiner

PEOPLE CONVEYOR SYSTEM AND A METHOD FOR UPDATING SOFTWARE OF A PEOPLE CONVEYOR COMPONENT IN A PEOPLE CONVEYOR SYSTEM

RELATED APPLICATIONS

This application claims priority to European Patent Application No. 20190689.8 filed on Aug. 12, 2020, and European Patent Application No. 20177284.5 filed on May 29, 2020, the entire contents of each which are incorporated herein by reference.

TECHNICAL FIELD

The invention relates to a people conveyor system and a method for updating software of a people conveyor component in a people conveyor system, such as an elevator system, an escalator system and/or a moving walkway system.

BACKGROUND

People conveyor system, such as elevators, comprise components each provided with a processor and a memory. In case of an elevator system, processor runs an elevator component-specific application software. During elevator lifetime, new features and/or corrections of existing features are provided in the form of new software versions. Also, for example the safety regulations may change during lifetime of the component. For these reasons, it is necessary to update the application software of one or more conveyor components to be able to take advantage of the new features or corrected operation of the software.

In prior art solutions application software updating process has been traditionally performed manually on-site, e.g. on elevator site by an elevator service technician. In these kind of solutions a service technician enters elevator site, removes elevator from normal operation, connects a programming tool such as a laptop to an elevator controller and updates the software. Afterwards the service person restores normal elevator operation and checks correct operation. This kind of update procedure is however labor-intensive, increases elevator downtime and contains a risk of human error.

There are also some prior art solutions in which the update can be done remotely. However, there are situations which may cause problems to these prior art systems. For example, slow connection speed causes the operation of the elevator be interrupted for a long time because the operation of the elevator is interrupted during download in the prior art systems. Also, if the communication connection is lost, even longer interruption to the operation of the elevator is caused if the elevator has to wait for the connection to start working again and then to continue the download. In some prior art solutions, the elevator stays out of operation all this time as long as the software download is successful, and the new version of the software has been installed. Also, if software is installed immediately when the download is ready, problems can be caused because software installation interrupts the operation of the elevator and the time of the interruption may not be optimal (for example rush hour time) for carrying out the software update.

One prior art solution relating to updating elevator component software is disclosed in document EP3173366 B1 which relates to automatically updating a controller application in a component of an automated passenger conveying device.

The solutions of the prior art are not able to handle automatic software updates reliably in changing and challenging conditions and without disturbing operation and users of the conveyor system.

SUMMARY

An object of the invention is to present a people conveyor arrangement and a method for updating software of a people conveyor component in a people conveyor system, such as an elevator, an escalator and/or a moving walkway. In the solution of the invention the software update can be carried out automatically and reliably without disturbing operation of the conveyor system and its users. The software updates of the components can be carried out also in changing and challenging conditions, for example with reduced data transfer speeds or when there are communication connection interruptions.

According to a first aspect, the invention relates to a method for software update of a people conveyor component in a people conveyor system, such as an elevator system, escalator system and/or moving walkway system. The conveyor system comprises a plurality of conveyor components, each said conveyor component comprising a memory and a processor running an application software, an updating means for updating conveyor component software, the updating means being communicatively connected to the conveyor components, wherein the updating means comprises or is connected to a processor and a memory, and at least one communication channel, arranged between the updating means and a remote update system. In the method the updating means downloads a software update from the remote update system via the at least one communication channel based on request from the remote update system and/or based on the request from at least one conveyor component and/or the people conveyor system, wherein the software download from the remote update system to the updating means and/or from the updating means to the conveyor component is performed as a background download and/or without affecting the operation of the people conveyor.

In one embodiment of the invention the updating means schedules installation of a software update to a certain predefined time and/or with certain predefined criteria, and/or wherein the updating means schedules installation of a software update of a conveyor component upon verification of the integrity of the downloaded update software.

In one embodiment of the invention a further verification of the integrity of the update software may be carried out to verify that the software was installed correctly and that correct version of the software was used for the installation. In one embodiment of invention the verification can be implemented in the following way: after the software update has been installed to the conveyor component, the updating means reads or receives the installed software from the conveyor component and further sends it back to the remote update system. The remote update system then verifies that the installed software is in line with the original software update.

In one embodiment of the invention the updating means schedules installation of software updates of the conveyor components to be carried out in a predefined order of the conveyor components, and/or wherein the predefined order is established based on functional dependencies between the conveyor components.

In one embodiment of the invention the updating means sends a software status enquiry to the conveyor components responsive to the request from the remote update system, generates a software status list of the conveyor components based on their responses to the enquiry and sends the software status list to the remote update system for generating the collective update software.

In one embodiment of the invention the software update is a collective update software comprising application software of at least part of the conveyor components connected to the updating means, e.g. the collective update software being conveyor-specific or conveyor system specific such as elevator-specific or elevator group-specific. In one embodiment of the invention the updating means checks integrity of the collective software update, schedules update of selected conveyor components and then sends application software from its memory to each said conveyor components e.g. in a predetermined order.

In one embodiment of the invention the application software is conveyor component-specific application software and comprising an installation key, such as an encryption key, associated with a conveyor component, wherein specific counterpart of the said application software can be installed only in the conveyor component associated with the respective installation key. Additionally or alternatively, there may be a verification or certification provided by a separate unit or device, such as a certification server, which ensures that the software update originates from a reliable source. This is especially important when updating software of an elevator safety component(s), such as elevator safety controller implementing e.g. programmable safety (i.e. PESSRAL) in accordance with safety integrity level 3 (SIL3), fulfilling related safety norms (e.g. EN81-20; IEC61508).

In one embodiment of the invention the remote update system sends the update software data on segments or blocks, for example in the form of a chained list, each segment or block provided with an identification, and wherein the updating means reassembles the downloaded update software from the segments of blocks, on the basis of the respective identifications.

In one embodiment of the invention the updating means requests the remote update system to resend one or more identified data segments or blocks in case of failure of verification of the integrity.

In one embodiment of the invention the at least one communication channel comprises at least two separate parallel physical media between the updating means and the remote update system, and/or wherein the physical media may comprise a data cable and/or a wireless network, such as a cellular network.

According to a second aspect, the invention relates to a people conveyor system, such as an elevator system, escalator system and/or moving walkway system, comprising a plurality of conveyor components, each said conveyor component comprising a memory and a processor running an application software, an updating means for updating conveyor component software, the updating means being communicatively connected to the conveyor components, wherein the updating means comprises or is connected to a processor and a memory, and at least one communication channel, arranged between the updating means and a remote update system. The updating means is configured to download a software update from the remote update system via the at least one communication channel based on request from the remote update system and/or based on the request from at least one conveyor component and/or the people conveyor system, and the conveyor system is configured to perform the software download from the remote update system to the updating means and/or from the updating means to the conveyor component as a background download and/or without affecting the operation of the people conveyor.

According to a third aspect, the invention relates a computer program comprising instructions which, when executed by a computer, cause the computer to carry out the method according to the solution of the invention.

According to a fourth aspect, the invention relates to a computer-readable medium comprising the computer program according to the solution of the invention.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The embodiments of the invention are illustrated by way of example, and not by way of limitation, in the figures of the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Reference will now be made in detail to the embodiments of the present invention, examples of which are illustrated in the accompanying drawings.

The solution of the invention is related to a conveyor system which comprises at least one conveyor component, each of which conveyor component comprises a memory and a processor running an application software. The solution of the invention provides a way for updating the application software of the conveyor components.

Figure 1:
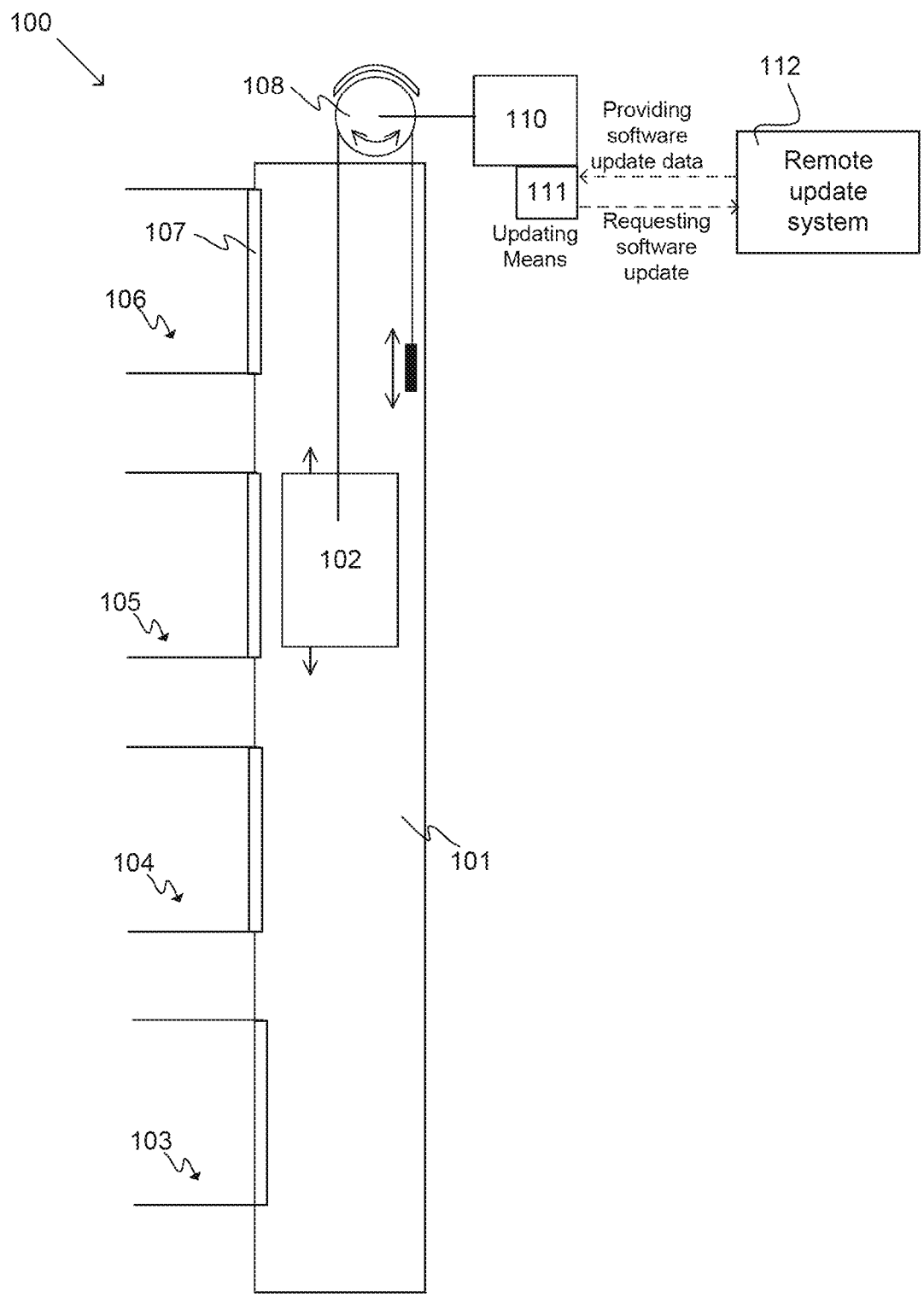
FIG. 1 illustrates an elevator according to one embodiment of the invention.

FIG. 1 schematically illustrates an embodiment according to the present invention in which the people conveyor is an elevator in which the solution of the invention can be used. The elevator comprises an elevator shaft 101 in which an elevator car 102 moves to serve different floors. In FIG. 1 the elevator car 102 can stop in a first floor 103, second floor 104, third floor 105 and fourth floor 106. The floors may be any floor in a building and not necessarily the first and second floor of the building. The first floor 103 may be, for example, garage and the second floor 104 the ground level. A landing door 107 can be arranged in each floor in front of the elevator car 102. In FIG. 1 the elevator comprises a motor 108 configured to move the elevator car via the hoisting rope, wherein the motor 108 is controlled by an elevator control unit 110. This arrangement is, however, only an example. The updating means 111 for updating conveyor component software may be arranged in connection to the conveyor control unit and/or integrated to conveyor control unit, such as an elevator control unit 110. The updating means 111 is communicatively connected to the conveyor components, wherein the updating means 111 comprises or is connected to a processor and a memory.

Figure 2:
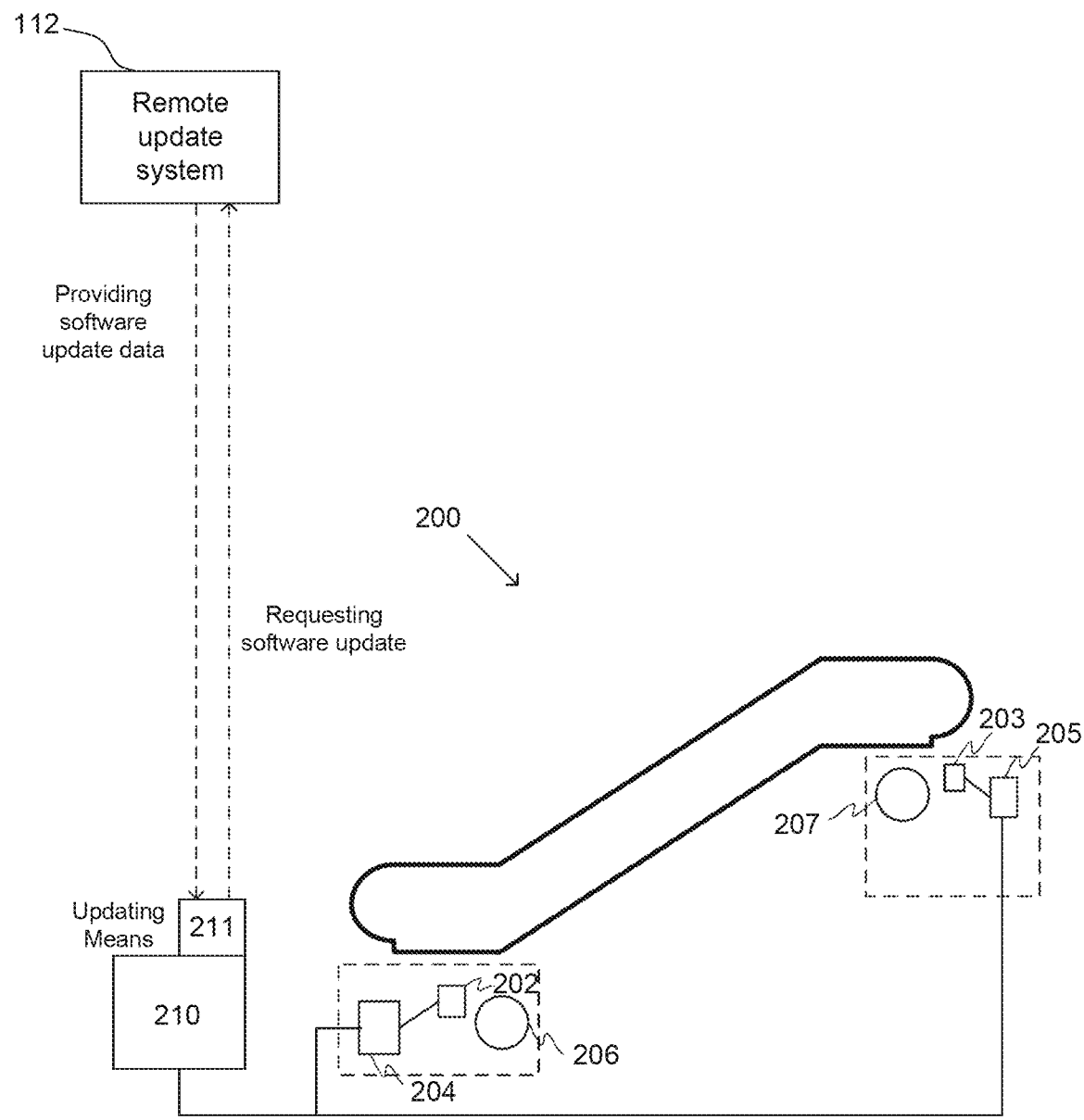
FIG. 2 illustrates an escalator according to one embodiment of the invention.

FIG. 2 schematically illustrates an embodiment according to the present invention in which the conveyor is an escalator 200 in which the solution of the invention can be used. The escalator may comprise a step-chain coupled to a motor 206 via a transmission 202 comprising at least a chain or belt or similar. The motor 206 may generate a rotational force via the transmission causing the step-chain to move in an intended travelling direction. A brake may be arranged to the conveyor system so that when de-energized it is configured to meet the rotating axis of the transmission and, in that manner, to brake movement of the step chain or keep the step chain standstill when the escalator system is idle.

When energized, the brake opens, allowing movement of step-chain. The transmission may comprise, in the context of escalator system, a gearbox with the mentioned entities. Furthermore, the escalator system may comprise an escalator control unit 210 which may e.g. be configured to control the movement of step-chain through a control of a power supply to the motor 202 and to the escalator brake. In one embodiment of the invention the conveyor system can comprise a processing unit 204. In some embodiments a second motor 207 with a second transmission 203 may be provided, for example, at the opposite end of the step-chain. Then a second processing unit 205 may be mounted to the in connection with the second motor. The updating means 211 for updating conveyor component software may be arranged in connection to the escalator control unit 210 and/or integrated to escalator control unit 210. The updating means 211 is communicatively connected to the conveyor components, wherein the updating means 211 comprises or is connected to a processor and a memory.

In the solution of the invention the components and functions of a people conveyor device can be updated according to the solution of the invention. The people conveyor can be for example the elevator system presented in FIG. 1 or an escalator system presented in FIG. 2. The solution uses at least one remote update system for sending the and/or establishing the updated software and/or updated software components. The remote update system 112 can be e.g. a remote computing device, such as a server, or a cloud service. At least one communication channel is arranged between the people conveyor component and a remote update system 112. In the solution of the invention the updating means downloads a software update from the remote update system via the at least one communication channel based on request from the remote update system and/or based on the request from at least one conveyor component and/or the people conveyor system. In one embodiment of the invention the remote update system can inform device, e.g. the updating means, about the new software updates. In one embodiment of the invention the device or component or updating means can request information about the software updates from the remote update system and the device, component and/or updating means can request or select a specific update.

The software download from the remote system to the updating means and/or from the updating means to the conveyor component can be performed as a background download and/or without affecting the operation of the people conveyor. This way interruptions in data communication or slow transfer speeds do not cause interruption to the operation of the conveyor device. When the device starts to receive data, it stores it to its memory and continues to transfer data as long as the transfer of the update data is complete. If the transfer is interrupted, it can be continued when the required systems are operational and/or e.g. when operation of the communication channel can be resumed. When the whole software has been transferred to the correct component or device, the update, i.e. installation of the software update, can be started at the desired moment. The installation time or moment can be selected e.g. so that the interruption of operation for users can be kept minimal. In one embodiment of the invention the determination of the installation time can be based on certain time, e.g. night, or collected usage statistics, in which case the installation of the update can be done when the usage level is lowest during the day or week and/or usage level is under certain threshold level. In one embodiment of the invention the installation of the software update is not carried out before a confirmation from a user of the update system or from the remote update system is received. In one embodiment of the invention the system carries out the installation of the software after it has received a confirmation from a user locally from the conveyor system site.

In one embodiment of the invention a software or software update, e.g. a collective software update, is downloaded as a background download to memory of a separate update means, i.e. not directly to the conveyor component but to a separate memory device, e.g. located at conveyor site. After that, the updating means can check integrity of the software update and/or schedule update of selected conveyor components. After this the application software can be sent from the memory of the updating means to each said conveyor components, e.g. according to a schedule, such that conveyor components will be updated in a predetermined order. In one embodiment of the invention the downloading of software or update data from the remote update system to the updating means is done as a background download. Transferring of the software or software update data from the updating means to the conveyor component can be done in one embodiment of the invention as a background download and in another embodiment of the invention not as a background download, i.e. so that the conveyor component under software download and installation can be inoperable.

In one embodiment of the invention at least a part of the conveyor components can be updated via the updating means. In one embodiment of the invention at least part of the conveyor components can receive the update data directly from the remote update system. In embodiment of the invention the updating can be done as a combination of the above described embodiments, e.g. so that a part of the conveyor components receive the software or software update via the updating means and a part of the conveyor components receive the software or software update directly from the remote update system.

The memory of the device and/or component is such that at least the whole program of the device can fit to the memory. The memory can be any kind of memory, for example non-volatile memory such as flash memory.

According to an embodiment, the remote update system is configured to send the update software data on segments or blocks, for example in the form of a chained list. Each segment or block is provided with an identification. The updating means is configured to reassemble the downloaded update software from the segments or blocks, on the basis of the respective identifications. The updating means is configured to schedule a software update of an elevator component upon verification of the integrity of the downloaded update software, such that all segments/blocks have been downloaded. This can mean that, upon communication interrupt or missing some segments or blocks, the updating means can resume the software download without need of reloading the entire software. This can also be used to verify that the software has been transferred and stored to the memory successfully, e.g. without any errors.

Updating means can control the software updates of different components and for example send component specific update data to components and/or instruct the components to start installation of the updated software. As described above, transferring of the software or software update data from the updating means to the conveyor component can be done in one embodiment of the invention as a background download and in another embodiment of the invention not as a background transfer, i.e. so that the conveyor component under software download or installation can be inoperable.

According to an embodiment, the updating means requests the remote update system to resend one or more identified data segments or blocks in case of failure of verification of the integrity. This can mean that, upon communication interrupt or missing some segments or blocks, the updating means can resume the software download without need of reloading the entire software.

According to an embodiment, the remote link comprises at least two separate parallel physical media between the updating means and the remote update system. This can mean that software download may be speeded up by using at each time the remote link(s) with best transfer capacity.

According to an embodiment, the physical media may comprise a data cable and/or a wireless network, such as a cellular network.

According to an embodiment, the update software is a collective update software comprising application software of the elevator components. In one embodiment the collective update software is elevator-specific or elevator group-specific, accepted by the updating means. In one embodiment of the invention the updating means checks integrity of the collective software update, schedules update of selected conveyor components and then sends application software from its memory to each said conveyor components e.g. in a predetermined order.

According to an embodiment, the application software is elevator component-specific, comprising an installation key, such as an encryption key, associated with an elevator component-specific counterpart such that said application software may be installed successfully only in the elevator component associated with the respective installation key. In one embodiment each elevator component comprises a secure chip comprising a component-specific encryption key.

According to an embodiment, the updating means is configured to send a software status enquiry to the elevator components responsive to the request from the remote update system. The updating means is configured to generate a software status list of the elevator components based on their responses to the enquiry such that status or version of each application software associated with respective elevator components listed. The updating means sends the software status list to the remote update system, and the remote update system checks which components require application software update and generates the collective update software accordingly.

According to an embodiment, the updating means is configured to schedule a software update of the elevator components in a predetermined order. In one embodiment the predetermined order is established based on functional dependencies between the elevator components. For example, before updating specific elevator components it may be necessary to update some functionally co-acting components to ensure operational integrity or safety. For example, to update safety sensor software before updating safety controller reading the sensor. Wrong update sequence might also lead to communication interruption between elevator components. Therefore, the specified update order may also speed up the update process and shorten elevator downtime.

Upon a successful software update of the elevator component(s), an inspection operation may be performed under a virtual presence of a service technician or an operator. This can mean that, for example, an operator located in remote service center receives a camera signal from elevator site via a remote link and ensures operational integrity by visually observing the camera signal.

The conveyor components can be communicatively connected to the updating means, e.g. via a serial data bus, such as CAN bus, LON bus or ethernet. The updating means can be configured to download an update software from the remote update system by using a transfer protocol accepted between the updating means and the remote update system, for example TCP/IP.

The updating means may be a separate processing unit, or it may be a functionality added to some existing conveyor component, such as an elevator control unit and/or elevator group controller. In one example embodiment, the conveyor system, such as an elevator system, comprises conveyor components, e.g. elevator components, each comprising a memory and a processor running a component-specific application software. The conveyor control component may be one of conveyor elevator control unit, e.g. an elevator control unit, (for example the unit receiving landing calls, calculating movement profile for elevator car service), drive unit (for example the unit providing power signals to hoisting motor to move elevator car according to the movement profile), safety controller (for example the unit programmable safety device fulfilling EN 61508 safety integrity level 3), brake controller (for example the unit supplying current/interrupting current supply of electromagnets of hoisting machinery brakes to release/engage the brakes), call giving unit (for example the unit for inputting manual service requests by the passengers), car control panel, destination operation panel, door operator (for example the unit for opening/closing elevator doors), elevator car position detection unit, inspection drive unit (for example the unit for manual inspection drive), group control unit (for example the unit for allocating service requests to different elevators), overspeed governor unit (for example the unit for monitoring overspeed situation of elevator car), a sensor measuring an operational parameter of the elevator (for example safety contact, temperature sensor, camera), voice intercom device.

In one embodiment of the invention a software, e.g. a collective software update data, will be downloaded from remote server into a separate updating means. After the collective software has been downloaded into the separate updating means, the updating means will check the integrity of the data and/or schedule the downloads to two or more conveyor components such that they will be updated in a predetermined order. Then the updating means will download and install the application software from its memory to the conveyor components according to a predetermined order. During said local download and installation from the updating means to the conveyor components, conveyor component under installation can be inoperable, in which case the data transfer from updating means to the conveyor components is not done as a background download.

In one embodiment of the invention the updating means is configured to operate in the same manner as described above, e.g. in the previous paragraph, but it has been integrated into a conveyor component. Then download to the updating means from the remote server takes place as a background download, so the conveyor system will be operational during download from the remote server to the updating means. After collective software has been downloaded to the integrated updating means, application software will then be installed from the updating means to conveyor components in a predetermined order, e.g. in the same way as described above.

Figure 3:
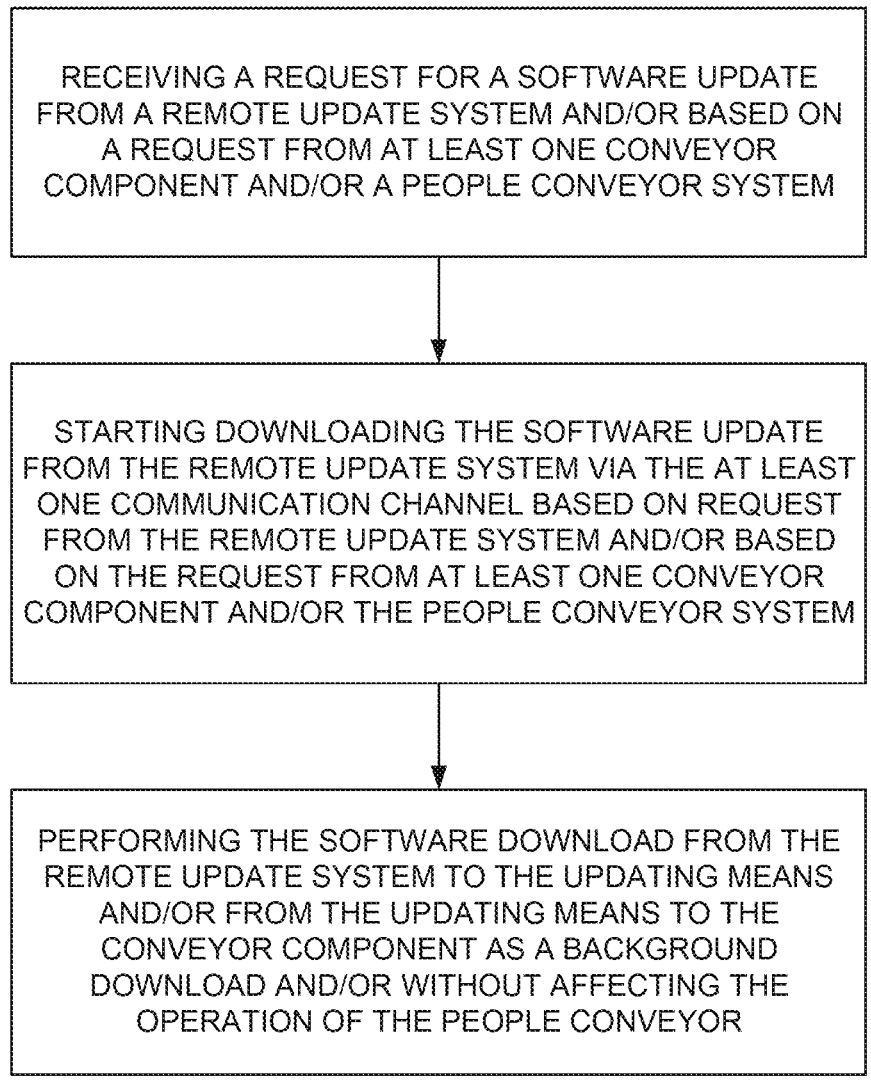
FIG. 3 presents a flow chart illustrating a method according to one embodiment of the invention.

In FIG. 3 a method according to an example embodiment is disclosed. The method is initiated by receiving a request for a software update from a remote update system and/or based on a request from at least one conveyor component and/or a people conveyor system. The method proceeds to starting downloading the software update from the remote update system via the at least one communication channel based on request from the remote update system and/or based on the request from at least one conveyor component and/or the people conveyor system. In the method of FIG. 3, the software download from the remote update system to the updating means and/or from the updating means to the conveyor component is performed as a background download and/or without affecting the operation of the people conveyor The transmissions between the units and/or components, e.g. sending requests, responses and/or the software update data, may be performed by using a wireless or wired transmitter. The transmitter may be an independent transmitter using mobile communication networks, Wi-Fi or similar. However, it is also possible to use the transmission channels that are dedicated particularly for a certain unit and/or part on the people conveyor, e.g. in the case of an elevator, a specific elevator car. The transmission may be encrypted. The transmission needs not to be a direct transmission but may involve any number of network elements in between. Thus, using an ordinary wireless internet connection is acceptable provided that the required units are able to receive the transmission.

A controller of a conveyor system in which the solution of the invention can be used may comprise at least one processor connected to at least one memory. The at least one memory may comprise at least one computer program which, when executed by the processor or processors, causes the controller to perform the programmed functionality. In another embodiment, the at least one memory may be an internal memory of the at least one processor. The controller may also comprise an input/output interface. Via the input/output interface, the control apparatus may be connected to the required devices or units. The controller may be a control entity configured to implement only the above disclosed operating features, or it may be part of a larger elevator control entity, for example, a conveyor controller, such as an elevator controller, an escalator controller or a moving walkway controller.

As stated above, the components or other parts of the exemplary embodiments can include computer readable medium or memories for holding instructions programmed according to the teachings of the present embodiments and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD1RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge or any other suitable medium from which a computer can read.

The embodiments of the invention described hereinbefore in association with the figures presented and the summary of the invention may be used in any combination with each other. At least two of the embodiments may be combined together to form a further embodiment of the invention.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for performing a software update of a people conveyor component in a conveyor system, the conveyor system including a plurality of conveyor components, a controller communicatively connected to the conveyor components and a remote update system connected to the controller via at least one communication channel, wherein the method comprises:
    downloading the software update from the remote update system based on a request from one or more of the remote update system, at least one conveyor component or the conveyor system such that the software update is downloaded as within a background download without affecting an operation of the conveyor system, the software update being a collective software update that includes software updates associated with a plurality of the conveyor components;
    checking an integrity of the collective software update associated with the plurality of the conveyor components prior to distributing the collective software update to plurality of conveyor components such that the integrity is checked within the background without affecting the operation of the conveyor system;
    scheduling a set order of updating selected conveyor components among the plurality of conveyor components only after the checking verifies the integrity of the collective software update; and
    sending particular ones of the software updates associated with respective ones of the plurality of conveyor components to the respective ones of the plurality of conveyor components in the set order.

2. The method according to claim 1, wherein the scheduling comprises:
    determining the set order based on functional dependencies between the conveyor components.

3. The method according to claim 1, further comprising:
sending a software status inquiry to the conveyor components responsive to the request from the remote update system;
generating a software status list of the conveyor components based on their responses to the software status inquiry; and
sending the software status list to the remote update system for generating the collective software update.

4. The method according to claim 1, wherein the software updates are for conveyor component-specific application software that includes an encryption key, associated with a specific one of the plurality of conveyor components such that the conveyor component-specific application software can be installed only in the specific one of the plurality of the conveyor components configured to decrypt the encryption key.

5. The method according to claim 1, wherein the remote update system sends the software update in segments or blocks such that each segment or block is provided with an identification, and the method further comprises:
reassembling the downloaded software update from the segments or blocks, on the basis of the respective identifications.

6. The method according to claim 5, further comprising:
requesting the remote update system to resend one or more of the segments or blocks, in response to a failure in the checking the integrity of the collective software update.

7. The method according to claim 1, wherein the controller is communicatively connected to the remote update system via a pair of separate parallel communication channels, the pair of separate parallel communication channels including one or more of a data cable or a wireless network.

8. A non-transitory computer readable medium storing a computer program comprising instructions which, when executed by a computer, cause the computer to carry out the method according to claim 1.

9. The method of claim 1, wherein the controller is a discrete component separate from the plurality of conveyor components, the controller including a first processor and a first memory and each of the plurality of conveyor components including respective second processors and second memories such that the controller downloads the collective software update from the remote update system and subsequently distributes particular ones of the software updates associated with respective ones of the plurality of conveyor components to the respective ones of the plurality of conveyor components in the set order after completion of downloading the collective software update.

10. A conveyor system, comprising:
a plurality of conveyor components; and
a controller configured to update software within the plurality of conveyor components, the controller being connected to a remote update system via at least one communication channel, the controller configured to,
download a software update from the remote update system via the at least one communication channel based on a request from one or more of the remote update system, at least one conveyor component or the conveyor system such that the software update is downloaded within a background without affecting an operation of the conveyor system, the software update being a collective software update that includes software updates associated with a plurality of the conveyor components,
check an integrity of the collective software update associated with the plurality of the conveyor components prior to distributing the collective software update to plurality of conveyor components such that the integrity is checked within the background without affecting the operation of the conveyor system,
schedule a set order of updating selected conveyor components among the plurality of conveyor components only after the check by the controller verifies the integrity of the collective software update, and
send particular ones of the software updates associated with respective ones of the plurality of conveyor components to the respective ones of the plurality of conveyor components in the set order.

11. The conveyor system according to claim 10, wherein the controller is configured to,
determine the set order based on functional dependencies between the conveyor components.

12. The conveyor system according to claim 10, wherein the controller is further configured to,
send a software status inquiry to the conveyor components responsive to the request from the remote update system,
generate a software status list of the conveyor components based on responses to the software status inquiry, and
send the software status list to the remote update system for generating the collective software update.

13. The conveyor system according to claim 10, wherein the software updates are for conveyor component-specific application software that includes an encryption key, associated with a specific one of the plurality of conveyor components such that the conveyor component-specific application software can be installed only in the specific one of the plurality of the conveyor components configured to decrypt the encryption key.

14. The conveyor system according to claim 10, wherein the remote update system sends the software update in segments or blocks such that each segment or block is provided with an identification, and wherein the controller is configured to,
reassemble the downloaded software update from the segments or blocks, on the basis of the respective identifications, and
request the remote update system to resend one or more of the segments or blocks, in response to a failure in the controller checking the integrity of the collective software update.

15. The conveyor system according to claim 10, wherein the controller is communicatively connected to the remote update system via a pair of separate parallel communication channels, the pair of separate parallel communication channels including one or more of a data cable or a wireless network.

16. The conveyor system according to claim 10, wherein the controller is an elevator control unit, escalator control unit or a moving walkway control unit.

17. The conveyor system according to claim 10, wherein each of the plurality of conveyor components is one of conveyor control unit, elevator control unit, drive unit, safety controller, brake controller, call giving unit, car control panel, destination operation panel, door operator, elevator car position detection unit, inspection drive unit, group control unit, overspeed governor unit, a sensor measuring an operational parameter of the conveyor system, a voice intercom unit.

18. The conveyor system according to claim 10, wherein
- the conveyor system is an elevator comprising at least an elevator car, a motor configured to move the elevator car and an elevator controller configured to control the elevator, or
- the conveyor system is an escalator comprising at least steps, step chain, a motor configured to move the step chain and an escalator controller configured to control the escalator, or
- the conveyor system is a moving walkway comprising at least pallets, pallet chain, a motor configured to move the pallet chain and a moving walkway controller configured to control the moving walkway.

19. The conveyor system of claim 10, wherein the controller is a discrete component separate from the plurality of conveyor components, the controller including a first processor and a first memory and each of the plurality of conveyor components including respective second processors and second memories such that the controller downloads the collective software update from the remote update system and subsequently distributes particular ones of the software updates associated with respective ones of the plurality of conveyor components to the respective ones of the plurality of conveyor components in the set order after completion of downloading the collective software update.

* * * * *